Sept. 24, 1929.  E. M. JOHNSON  1,728,997
VEHICLE ROUTE DIRECTORY DEVICE
Filed April 16, 1927   2 Sheets-Sheet 1
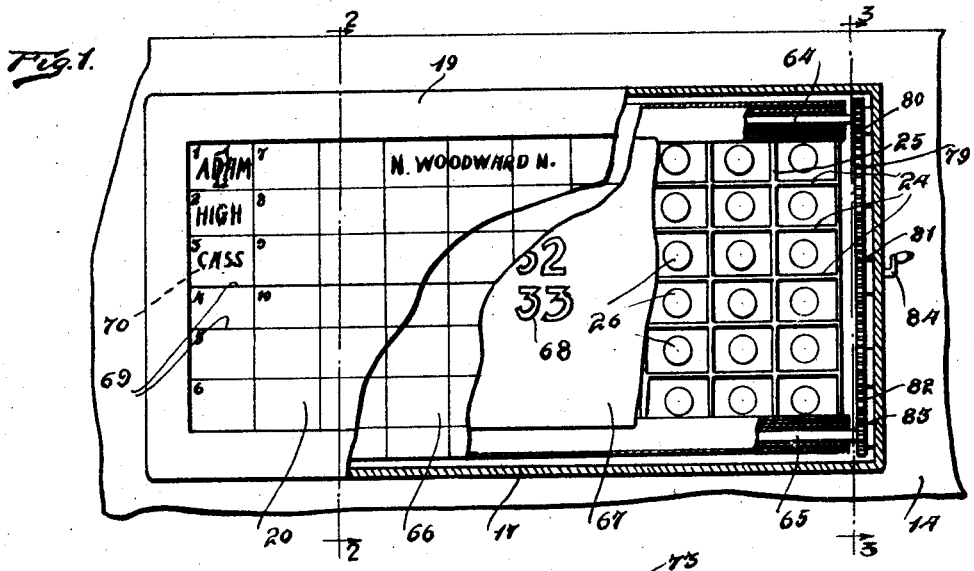
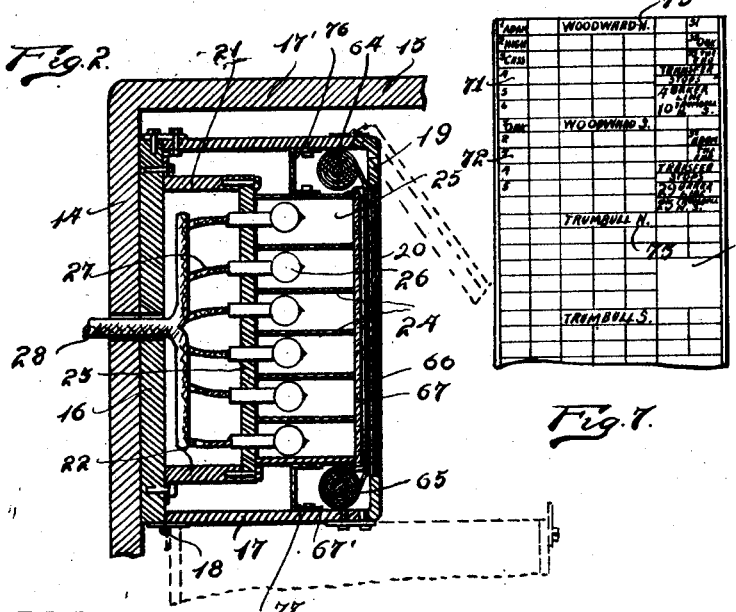
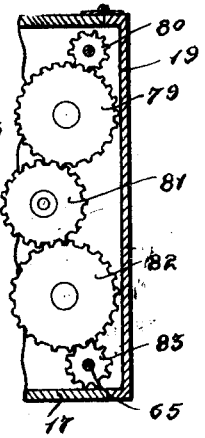
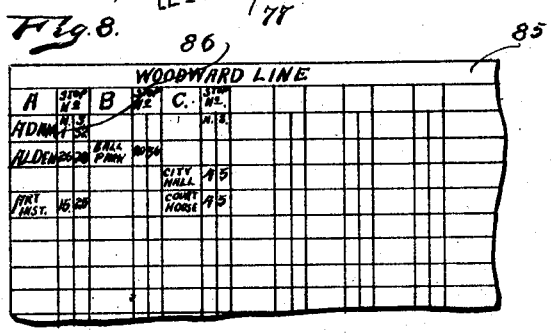
INVENTOR.
Ernest M. Johnson.
BY
ATTORNEY.

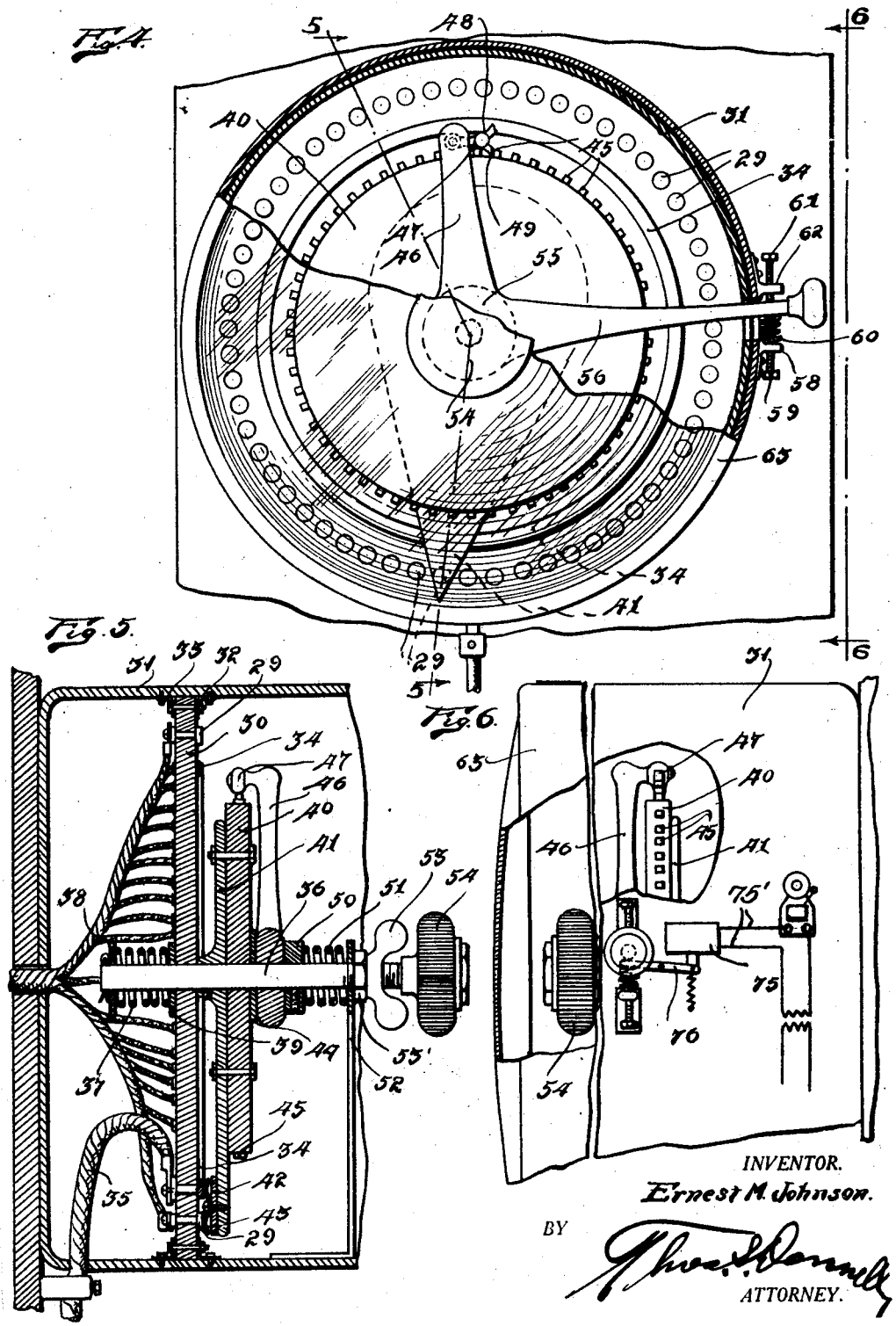

Patented Sept. 24, 1929

1,728,997

UNITED STATES PATENT OFFICE

ERNEST M. JOHNSON, OF HIGHLAND PARK, MICHIGAN

VEHICLE ROUTE-DIRECTORY DEVICE

Application filed April 16, 1927. Serial No. 184,201.

My invention relates to a new and useful improvement in a vehicle route directory device adapted for mounting in vehicles used as common carriers, such as street cars, trams, interurbans, etc.

It is an object of the present invention to provide an indicating mechanism whereby the approach of the vehicle to a definite stop may be indicated and whereby the occupants of the vehicle may easily and quickly inform themselves as to the relative approach of the vehicle to a specified stop, the various stops being arranged and indicated in consecutive order.

Another object of the invention is the provision in conjunction with a stop indicating mechanism of a chart or other indicating device which will serve as a directory indicating the various prominent establishments, or points of interest in proximity to the stops indicated.

Another object of the invention is the provision of a display mechanism which will serve to display all of the stops on a specified route travelled by the vehicle, located and arranged for individual displaying as the various individual stops are approached.

Another object of the invention is the provision of a switch mechanism which may be easily and quickly operated by the operator of the vehicle to call the attention of the occupants of the vehicle to the various stops approached individually.

Another object of the invention is the provision of a display bearing member having the various stops indicated over its area and adapted for positioning in front of a compartment bearing member and provided with means for individually illuminating each compartment to separately display the various stops indicated on the display bearing member.

Other objects will appear from the description of the construction of the mechanism, the various purposes for which it is used and the different methods of operation.

The invention consists in the combination and arrangement of parts hereinafter described and claimed.

The invention will be best understood by a reference to the accompanying drawings which form a part of this specification, and in which, Fig. 1 is a front view of the display member and the display casing with parts broken away and parts shown in section.

Fig. 2 is a fragmentary view taken on line 2—2 of Fig. 1.

Fig. 3 is a fragmentary view taken on line 3—3 of Fig. 1.

Fig. 4 is a front view of the switch mechanism used in the invention.

Fig. 5 is a view taken on line 5—5 of Fig. 4.

Fig. 6 is a view taken on line 6—6 of Fig. 4.

Fig. 7 is a fragmentary plan view of the display member used in the invention.

Fig. 8 is a fragmentary plan view of a chart used in conjunction with the invention.

As shown in the drawings I have indicated in Fig. 2 the forward wall 14 of the vehicle and the ceiling 15. Secured to the wall 14 is a plate or board 16, projecting outwardly from which at opposite ends is a top wall 17' and the bottom wall 17 of a housing having suitable end walls. The bottom wall 17 is hingedly connected as at 18 to the plate or board 16. A closure 19 swingably mounted on the top 17' is provided with a transparent front 20. Secured to and projecting outwardly from the plate or board 16 is a suitable support 21 cooperating with the support 22 to support the partition or socket support 23, mounted in front of, and projecting outwardly from which are a plurality of partitions 24 cooperating with the partitions 25 to provide a number of compartments, in each of which is mounted a light 26, each connected by a separate wire 27 extending through the cable 28 to individual contacts 29 mounted upon the contact board 30 which is supported by means of the brackets 32 and 33 in the housing 31. Mounted on the contact board 30 is a metallic contact ring 34 connected by means of the wire 35 to a suitable source of electrical energy, so that an electrical connection between the ring 34 and the individual contacts 29 will close a circuit to the lights 26 individually, each of the contacts 29 being provided with each of the lights positioned in the compartments. Projected through the contact plate 30 and through the upwardly projecting support 52 in the housing is a shaft 36 mounted upon which in embracing relation is a coil spring 37 engaging at one end the washer 38 which is mounted on the shaft 36, and at the other end the washer 39 which engages the rear side of the contact board 30. Mounted so as to rotate with the shaft 36 is a disc 40, attached to the inner face of which is a contact arm 41 carrying on its end a bow-shaped contact 43 insulated from the arm 41 by means of the insulation block 42. This contact 43 is so arranged that as the shaft 36 is rotated, one end of the contact will ride on the ring 34, and the other end will engage the several contact members 29 to individually close the circuits to the various lights 26.

Mounted on the shaft 36 so as to operate as a spacer is a washer 44 spacing the arm 46 from the disc 40. The arm 46 is provided at its free end with a swingably mounted dog 47 having two arms 48 and 49 projecting outwardly therefrom and adapted to engage teeth 45 formed on the periphery of the disc 40. The arm 46 projects outwardly from a hub 55 as clearly seen in Fig. 4. Mounted on the shaft 36 and fixed thereto by a set screw is a collar 50 engaging against which is one end of the coil spring 51, the other end engaging the upwardly projecting portion 52. A wing nut 53 cooperating with a nut 53' serves to bind the shaft in fixed relation axially of the contact board 30, this shaft 36 being axially slidable in the board 30. A suitable operating knob 54 is fixedly mounted upon the shaft 36 so that a rotation of the shaft may be effected in either direction when desired. Projecting outwardly from the hub 55 is an arm 56 extending radially of the disc 40 and projecting beyond the periphery of the contact board 30 and extending between brackets 58 and 62 which are fixed upon the periphery of the housing 31. Threaded into the bracket 58 is a screw 59 positioned about which in embracing relation so as to engage in one end the bracket 58 and at the other end the arm 56, is a spring 60. A screw 61 is threaded into the bracket 62.

Mounted on the housing which encloses the contact board is a swingable cover 63 having its forward side preferably closed with a transparent covering.

Rotatably mounted in the housing containing the compartments is a roller 64 cooperating with a roller 65 upon which is adapted to be rolled a strip of flexible material 66. A transparent closure 67 is retained in position in front of the compartments by means of the guide members 67', this closure 67 being slid into position, these guide members forming channels for the engagement of the member 67. Mounted on the member 67 are display members, preferably numbers, the number of these numbers being equal to the number of compartments and each positioned in alignment with one of the compartments. The flexible material or curtain 66 is divided into a number of squares 69 corresponding in size and number to the compartments, and each adapted, upon movement of the curtain, or flexible material 66, to proper position, for aligning with one of the compartments. Displayed in each of these squares is printed matter or display 70.

As shown in Fig. 7, this curtain 66 is divided into a plurality of route sections 71 and 72, each section designated by suitable display matter in the space 73.

The compartment bearing member is connected by suitable supports 76 and 77 to the member 17' and the member 17 respectively.

An idler gear 79 is adapted to mesh with a gear 80 carried by the roller 64, the idler gear 79 meshing with another idler gear 81 which in turn meshes with an idler gear 82 meshing with a gear 83 mounted on the roller 65. A suitable crank 84 is adapted to rotate the gear 81 so as to effect a rotation of the rollers 64 and 65.

In connection with the apparatus already described, I also use a directory chart 85 having a designating display 86 thereon, and divided into a plurality of sections, in each of said sections appearing the display which is carried by the curtain 66 in its various sections 71 and 72, and also carrying the display on the member 67. On this chart 85 the various matter displayed is arranged in alphabetical order so that it appears in a different order than it does on the chart 67 or the curtain 66.

The invention is intended for use with vehicles travelling certain designated routes having definite determined stops. In the use of the system, it is intended that these stops be numbered in numerical order, and preferably consecutively, although the consecutive numbering is not so necessary as the numerical order. When the vehicle is about to set out on its travel on a certain definite route, the curtain 66 is wound or unwound on the rollers 64 and 65 until the proper section 71 or 72 desired is positioned in alignment with the compartments. The closure 67 corresponding to the route is then placed in position. This closure, however, may be used for various routes as it is intended that most of the routes be numbered in the same consecutive order. The proper chart 85 is then mounted in position, this chart being mounted on the interior of the car in a position visible to the occupants thereof. The compartment bearing housing is also mounted in the car visible to the occupants thereof, so that the names of the streets displayed on the curtain 66 will be visible to the occupants. The display numbers 68 on the member 67 will, however, be positioned behind the curtain and normally invisible to the occupants of the vehicle. As the various stops are approached the operator of the vehicle will, by pressing downwardly on the handle 56, effect a rotation of the disc 40 a single notch, one of these notches being provided for each of the contact members. This will close a circuit to an individual light 26, and serve to cast through the curtain 66 the number corresponding to the stop approached. This will indicate to the occupants of the vehicle that the next stop is the stop corresponding to the illuminated number displayed through the housing.

By observing the housing in which the curtain 66 is positioned, the occupant can know definitely as to the relative approach of the stop at which to alight, thus saving much time and labor on the part of the operators of the vehicle, and eliminating much confusion and extending to the passengers an intelligent directory service. When the contact 47 moves the disc a single notch a release of the pressure on the arm 56 will restore the dog into engagement with the next succeeding tooth 45. The adjustment by means of the screws 61 and 59 will determine the amount of movement of the disc 40.

The chart 85 is provided as a sort of directory for the occupants of the vehicle so that in order to ascertain the number of the stop at which they alight, it is not necessary to inspect the curtain 66, throughout, but the street may be very easily and quickly found in its alphabetical order, and the designating number of the stop determined. In addition to this information carried on the chart 85 there will be a general directory of locations, business places, etc., in proximity to the various stops.

In operating the device, if desired an alarm may also be used to indicate that the indication on the chart has been moved to a different station so as to attract the attention of the passengers thereto.

In Fig. 6 I have indicated a switch 75 which may be connected by the wire 75' to a suitable alarm, such as an electrically operated bell. A pivotally mounted arm 74 is so positioned as to engage the arm 56 when it is moved downwardly. In operation the operator may, upon approaching a transfer stop or other important location, by retaining the arm 56 pressed downwardly for a considerable length of time, serve, by sounding the alarm for this period of time to further attract the attention of the occupants of the vehicle to the particular stop approached.

In the operation of the switch mechanism it is desired that the contact be a firm and close contact at all times, so that an efficient operation of the device may be effected. The springs will serve to retain the contact at the desired tension, but the adjustment which I have provided also facilitates this tension, particularly after the device has been used for some time and the springs have lost some of their original resiliency.

In the use of the mechanism described it may be desirable at times to reverse the travel of the disc 40 and for this purpose the arms 48 and 49 may be swung to the other side, a downward movement of the arm 56 engaging the dog behind the tooth 45 and the springs serving to move the arm 56 upwardly sufficiently to rotate the disc 40 a single step.

The shaft 36 is movable axially of the contact board 30 so that when desired the knob 54 may be drawn outwardly against the compression of the springs 37 and 51 so that the disc 40 with the various parts attached thereto may be moved outwardly from the contact board 30. This is desired particularly where it is the intention of the operator to restore the contact arm to its original position. Were the contact 43 to engage the various contacts 29, a rotation of the mechanism to starting position would successively light up all of the lights in the compartments, and to avoid this the mounting of the mechanism so that the contacts may be cleared is provided for.

The display chart, as well as the curtain 66, may also carry other information, and particularly the names of various streets, especially where the device is used in the city and the skip stop system has been adopted.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. In a vehicle route directory device of the class described adapted for use on vehicles travelling over routes having stops at intersections: a display member displaying in consecutive order the names of consecutively arranged stops on said route; a display member displaying the numbers on said stops, the numbers on said display member registering with the names on said first mentioned display member; and means for individually portraying on said first mentioned display member said numbers.

2. A vehicle route directory device of the class described, comprising: a display member for displaying the names of stop streets; a display member normally invisible for displaying the numbers of said stop streets, the numbers registering with the names on said first mentioned display member; and means for rendering at will, individually said numbers visible on said first mentioned display member.

3. A vehicle route directory device of the class described, comprising: a display member for displaying the names of stop streets; a display member for displaying the numbers of said stop streets, said numbers being normally invisible, and each in registration with its respective stop street name on said first mentioned display member; and selective means for displaying in a visible manner individually said numbers.

4. In a vehicle route directory device of the class described, a compartment bearing member having a plurality of compartments; illuminating means in each of said compartments; individual means for illuminating each of said illuminating means, selective at will; a display member for displaying information concerning the stops on said route projected across said compartment bearing member; and an additional display member carrying the numbers of said stops projected across said compartment bearing member.

5. In a device of the class described a flexible display member having a plurality of sections, each section divided into a number of divisions, each section displaying all of the stops on a single route and each of said divisions displaying one of said stops individually with an individual designatory symbol; and a secondary display member positioned behind said flexible member displaying individually said symbols in alignment with the division carrying said symbol; and means for projecting said symbol from said secondary display member to said first mentioned display member.

6. A vehicle route directory device of the class described, comprising: a display member for permanently displaying the names of stop streets; a display member for displaying the numbers on said stop streets, said numbers being normally invisible, and each in registration with its respective stop street name on said first mentioned display member; and selective means for displaying in a visible manner individually said numbers.

7. In a device of the class described, a flexible display member displaying all of the stops on a single route; an individual designatory symbol for each of said stops; and a secondary display member positioned behind said flexible member displaying individually said symbols in alignment with the stop indication corresponding thereto on said flexible display member; and means for projecting said symbol from said secondary display member to said first mentioned display member.

In testimony whereof I have signed the foregoing specification.

ERNEST M. JOHNSON.